(12) United States Patent
Tu et al.

(10) Patent No.: US 7,895,334 B1
(45) Date of Patent: Feb. 22, 2011

(54) REMOTE ACCESS COMMUNICATION ARCHITECTURE APPARATUS AND METHOD

(75) Inventors: Edgar Allen Tu, Castor Valley, CA (US); Eric Pang, Sunnyvale, CA (US)

(73) Assignee: FusionOne, Inc., San Jose, CA (US)

( * ) Notice: Subject to any disclaimer, the term of this patent is extended or adjusted under 35 U.S.C. 154(b) by 1140 days.

(21) Appl. No.: 09/618,956

(22) Filed: Jul. 19, 2000

(51) Int. Cl.
*G06F 13/00* (2006.01)

(52) U.S. Cl. .................... 709/227; 709/229; 709/237; 718/100

(58) Field of Classification Search .............. 709/100, 709/227, 229, 237, 230; 718/100
See application file for complete search history.

(56) References Cited

U.S. PATENT DOCUMENTS

| | | | |
|---|---|---|---|
| 4,887,212 A | 12/1989 | Zamora et al. | 364/419 |
| 5,111,398 A | 5/1992 | Nunberg et al. | 364/419 |
| 5,115,466 A | 5/1992 | Presttun | |
| 5,130,993 A | 7/1992 | Gutman et al. | 371/42 |
| 5,146,221 A | 9/1992 | Whiting et al. | 341/67 |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,425,079 A | 6/1995 | Noda et al. | |
| 5,483,352 A | 1/1996 | Fukuyama et al. | 358/402 |
| 5,485,161 A | 1/1996 | Vaughn | 342/357.13 |
| 5,519,433 A | 5/1996 | Lappington et al. | 725/110 |
| 5,519,606 A | 5/1996 | Frid-Nielsen et al. | 364/401 |
| 5,543,789 A | 8/1996 | Behr et al. | 340/995 |
| 5,544,061 A | 8/1996 | Morimoto et al. | 340/995 |
| 5,561,446 A | 10/1996 | Montlick | 345/173 |
| 5,574,906 A | 11/1996 | Morris | 395/601 |
| 5,579,489 A | 11/1996 | Dornier et al. | |
| 5,588,009 A | 12/1996 | Will | 371/33 |
| 5,592,470 A | 1/1997 | Rudrapatna et al. | |
| 5,623,406 A | 4/1997 | Ichbiah | 364/999.999 |
| 5,623,661 A | 4/1997 | Hon | 395/601 |

(Continued)

FOREIGN PATENT DOCUMENTS

CN 1202662 12/1998

(Continued)

OTHER PUBLICATIONS

Finnigan, Anne, "The Safe Way to Shop Online," Sep. 1998, p. 162, Good Housekeeping, v. 227 No. 3.

(Continued)

*Primary Examiner*—Kenneth R Coulter
(74) *Attorney, Agent, or Firm*—Haverstock & Owens, LLP

(57) ABSTRACT

Disclosed herein is a system and method for communicating data from a base computer to a remote device via a central server system without the necessity of specialty software on the remote device. Remote devices such as laptop computers and cellular telephones communicate with the central server system, while the central server system likewise communicates with base computers. Communications between the central server system and the base computers are facilitated by an intermittent query from base computers to the central server system in a manner which allows communication even in a firewall-constrained environment. The system and method provides a means for facilitating both persistent connections and dialup communications between the base computers and the central server system.

17 Claims, 5 Drawing Sheets

U.S. PATENT DOCUMENTS

| | | | |
|---|---|---|---|
| 5,628,005 A | 5/1997 | Hurvig | 395/608 |
| 5,630,081 A | 5/1997 | Rybicki et al. | 395/348 |
| 5,638,508 A | 6/1997 | Kanai et al. | 714/20 |
| 5,640,577 A | 6/1997 | Scharmer | 395/765 |
| 5,644,709 A | 7/1997 | Austin | |
| 5,647,002 A | 7/1997 | Brunson | 380/49 |
| 5,649,195 A | 7/1997 | Scott et al. | 395/617 |
| 5,650,800 A | 7/1997 | Benson | |
| 5,666,397 A | 9/1997 | Lamons et al. | |
| 5,666,553 A | 9/1997 | Crozier | 395/803 |
| 5,682,524 A | 10/1997 | Freund et al. | 395/605 |
| 5,684,990 A | 11/1997 | Boothby | 395/619 |
| 5,694,596 A | 12/1997 | Campbell | 395/610 |
| 5,699,255 A | 12/1997 | Ellis et al. | 701/212 |
| 5,701,423 A | 12/1997 | Crozier | 395/335 |
| 5,706,509 A | 1/1998 | Man-Hak Tso | 395/617 |
| 5,710,922 A | 1/1998 | Alley et al. | 395/617 |
| 5,727,202 A | 3/1998 | Kucala | 395/610 |
| 5,727,950 A * | 3/1998 | Cook et al. | 434/350 |
| 5,729,735 A | 3/1998 | Meyering | 395/610 |
| 5,729,739 A | 3/1998 | Cantin et al. | 395/614 |
| 5,729,743 A | 3/1998 | Squibb | 395/619 |
| 5,742,792 A | 4/1998 | Yanai et al. | 395/489 |
| 5,745,750 A | 4/1998 | Porcaro | 707/102 |
| 5,745,906 A | 4/1998 | Squibb | 707/203 |
| 5,757,920 A | 5/1998 | Misra et al. | 380/25 |
| 5,758,150 A | 5/1998 | Bell et al. | 395/610 |
| 5,758,355 A | 5/1998 | Buchanan | 707/201 |
| 5,764,899 A | 6/1998 | Eggleston et al. | 709/203 |
| 5,768,480 A | 6/1998 | Crawford, Jr. et al. | |
| 5,768,597 A | 6/1998 | Simm | 395/712 |
| 5,771,354 A | 6/1998 | Crawford | 395/200.59 |
| 5,778,346 A | 7/1998 | Frid-Nielsen et al. | 705/9 |
| 5,778,361 A | 7/1998 | Nanjo et al. | 707/500 |
| 5,778,367 A | 7/1998 | Wesinger et al. | 395/10 |
| 5,778,388 A | 7/1998 | Kawamura et al. | 707/203 |
| 5,781,901 A | 7/1998 | Kuzma | 707/10 |
| 5,787,247 A | 7/1998 | Norin et al. | 395/200.5 |
| 5,787,262 A | 7/1998 | Shakib et al. | 395/200.35 |
| 5,794,228 A | 8/1998 | French et al. | 707/2 |
| 5,804,803 A | 9/1998 | Cragun et al. | 235/375 |
| 5,809,497 A | 9/1998 | Freund et al. | 707/2 |
| 5,812,773 A | 9/1998 | Norin | 395/200.34 |
| 5,812,793 A | 9/1998 | Shakib et al. | 395/200.31 |
| 5,818,437 A | 10/1998 | Grover et al. | 345/811 |
| 5,826,245 A | 10/1998 | Sandberg-Diment | 705/44 |
| 5,832,489 A | 11/1998 | Kucala | 707/10 |
| 5,832,518 A | 11/1998 | Mastors | 707/202 |
| 5,832,519 A | 11/1998 | Bowen et al. | 707/203 |
| 5,845,283 A | 12/1998 | Williams et al. | 707/101 |
| 5,859,973 A | 1/1999 | Carpenter | 395/200.33 |
| 5,864,864 A | 1/1999 | Lerner | 707/102 |
| 5,875,296 A | 2/1999 | Shi et al. | 395/188.01 |
| 5,884,323 A | 3/1999 | Hawkins et al. | 707/201 |
| 5,884,325 A | 3/1999 | Bauer et al. | 707/201 |
| 5,893,119 A | 4/1999 | Squibb | 707/203 |
| 5,896,321 A | 4/1999 | Miller | 365/189.01 |
| 5,897,640 A | 4/1999 | Veghte et al. | 707/202 |
| 5,897,642 A | 4/1999 | Capossela et al. | 707/203 |
| 5,903,723 A | 5/1999 | Beck et al. | 709/203 |
| 5,907,793 A | 5/1999 | Reams | 455/3.1 |
| 5,923,756 A | 7/1999 | Shambroom | 713/156 |
| 5,923,848 A | 7/1999 | Goodhand et al. | 395/200.49 |
| 5,926,816 A | 7/1999 | Bauer et al. | 707/8 |
| 5,933,653 A | 8/1999 | Ofek | 395/826 |
| 5,933,778 A | 8/1999 | Buhrmann et al. | |
| 5,933,816 A | 8/1999 | Zeanah et al. | 705/35 |
| 5,935,262 A | 8/1999 | Barrett et al. | 714/46 |
| 5,937,405 A | 8/1999 | Campbell | 707/10 |
| 5,941,944 A | 8/1999 | Messerly | 709/203 |
| 5,943,676 A | 8/1999 | Boothby | 707/201 |
| 5,944,787 A | 8/1999 | Zoken | 709/206 |
| 5,946,615 A | 8/1999 | Holmes et al. | 455/412 |
| 5,948,066 A | 9/1999 | Whalen et al. | 709/229 |
| 5,951,636 A | 9/1999 | Zerber | 709/202 |
| 5,961,572 A | 10/1999 | Craport et al. | 340/990 |
| 5,961,590 A | 10/1999 | Mendez et al. | 709/206 |
| 5,968,131 A | 10/1999 | Mendez et al. | 709/246 |
| 5,970,149 A | 10/1999 | Johnson | 714/46 |
| 5,970,490 A | 10/1999 | Morgenstern | 707/10 |
| 5,971,277 A | 10/1999 | Cragun et al. | 235/462.01 |
| 5,974,238 A | 10/1999 | Chase, Jr. | 395/200.78 |
| 5,974,563 A | 10/1999 | Beeler, Jr. | 714/5 |
| 5,987,381 A | 11/1999 | Oshizawa | 340/990 |
| 5,987,609 A | 11/1999 | Hasebe | 726/35 |
| 5,995,118 A | 11/1999 | Masuda | 345/467 |
| 6,000,000 A | 12/1999 | Hawkins et al. | 707/201 |
| 6,006,215 A | 12/1999 | Retallick | 707/2 |
| 6,006,274 A | 12/1999 | Hawkins et al. | 709/248 |
| 6,009,462 A | 12/1999 | Birrell et al. | 709/206 |
| 6,012,063 A | 1/2000 | Bodnar | 707/101 |
| 6,012,088 A | 1/2000 | Li et al. | |
| 6,014,695 A | 1/2000 | Yamashita et al. | 709/219 |
| 6,016,394 A | 1/2000 | Walker | 717/104 |
| 6,016,478 A | 1/2000 | Zhang et al. | 705/9 |
| 6,023,708 A | 2/2000 | Mendez et al. | 707/203 |
| 6,023,723 A | 2/2000 | McCormick et al. | 709/206 |
| 6,026,414 A | 2/2000 | Anglin | 707/204 |
| 6,034,621 A | 3/2000 | Kaufman | 340/825.44 |
| 6,038,665 A | 3/2000 | Bolt et al. | 713/176 |
| 6,044,381 A | 3/2000 | Boothby et al. | 707/201 |
| 6,049,776 A | 4/2000 | Donnelly et al. | 705/8 |
| 6,052,735 A | 4/2000 | Ulrich et al. | 709/236 |
| 6,058,399 A | 5/2000 | Morag et al. | 707/201 |
| 6,061,790 A | 5/2000 | Bodnar | 713/171 |
| 6,061,796 A | 5/2000 | Chen et al. | 713/201 |
| 6,063,134 A | 5/2000 | Peters et al. | |
| 6,064,880 A | 5/2000 | Alanara | 455/419 |
| 6,065,018 A | 5/2000 | Beier et al. | 707/202 |
| 6,073,133 A | 6/2000 | Chrabaszcz | 707/10 |
| 6,076,109 A * | 6/2000 | Kikinis | 709/228 |
| 6,078,960 A | 6/2000 | Ballard | 709/229 |
| 6,081,900 A | 6/2000 | Subramaniam et al. | 713/201 |
| 6,094,618 A | 7/2000 | Harada | 701/207 |
| 6,101,480 A | 8/2000 | Conmy et al. | 705/9 |
| 6,108,330 A | 8/2000 | Bhatia et al. | 370/352 |
| 6,108,703 A | 8/2000 | Leighton et al. | 709/226 |
| 6,112,024 A | 8/2000 | Almond et al. | |
| 6,115,797 A | 9/2000 | Kanda et al. | |
| 6,131,096 A | 10/2000 | Ng et al. | 707/10 |
| 6,131,116 A | 10/2000 | Riggins et al. | 709/219 |
| 6,141,011 A | 10/2000 | Bodnar et al. | 345/357 |
| 6,141,621 A | 10/2000 | Piwowarski et al. | 340/989 |
| 6,141,659 A | 10/2000 | Barker et al. | 707/102 |
| 6,141,664 A | 10/2000 | Boothby | 707/201 |
| 6,145,088 A | 11/2000 | Stevens | |
| 6,148,260 A | 11/2000 | Musk et al. | 701/200 |
| 6,151,606 A | 11/2000 | Mendez | 707/201 |
| 6,157,630 A | 12/2000 | Adler et al. | 370/310 |
| 6,163,773 A | 12/2000 | Kishi | 706/16 |
| 6,163,779 A | 12/2000 | Mantha et al. | 707/100 |
| 6,163,844 A | 12/2000 | Duncan et al. | 713/201 |
| 6,167,120 A | 12/2000 | Kikinis | 379/90.01 |
| 6,173,310 B1 | 1/2001 | Yost et al. | 709/201 |
| 6,173,311 B1 | 1/2001 | Hassett et al. | 709/202 |
| 6,182,117 B1 | 1/2001 | Christie et al. | 709/205 |
| 6,182,141 B1 | 1/2001 | Blum et al. | 709/227 |
| 6,185,598 B1 | 2/2001 | Farber et al. | 709/200 |
| 6,189,030 B1 | 2/2001 | Kirsch et al. | 709/224 |
| 6,189,096 B1 | 2/2001 | Haverty | 713/155 |
| 6,195,695 B1 | 2/2001 | Cheston et al. | 709/221 |
| 6,195,794 B1 | 2/2001 | Buxton | 717/11 |
| 6,202,085 B1 | 3/2001 | Benson et al. | 709/205 |
| 6,205,448 B1 | 3/2001 | Kruglikov et al. | 707/200 |

| | | | |
|---|---|---|---|
| 6,209,034 B1 | 3/2001 | Gladwin et al. | |
| 6,212,529 B1 | 4/2001 | Boothby et al. ............ 707/201 | |
| 6,212,556 B1 | 4/2001 | Arunachalam | |
| 6,216,131 B1 | 4/2001 | Liu et al. .................. 707/102 | |
| 6,219,680 B1 | 4/2001 | Bernardo et al. ............ 707/501 | |
| 6,223,187 B1 | 4/2001 | Boothby et al. ............ 707/201 | |
| 6,226,650 B1 | 5/2001 | Mahajan et al. ............ 707/201 | |
| 6,233,565 B1 | 5/2001 | Lewis et al. .................. 705/35 | |
| 6,233,589 B1 | 5/2001 | Balcha et al. ............ 707/203 | |
| 6,243,760 B1 | 6/2001 | Armbruster et al. ......... 709/243 | |
| 6,247,048 B1 | 6/2001 | Greer et al. | |
| 6,247,135 B1 | 6/2001 | Feague ...................... 713/400 | |
| 6,249,690 B1 | 6/2001 | Mashiko | |
| 6,252,547 B1 | 6/2001 | Perry et al. ............ 342/357.06 | |
| 6,255,989 B1 | 7/2001 | Munson et al. ........ 342/357.13 | |
| 6,256,750 B1 | 7/2001 | Takeda ...................... 714/11 | |
| 6,260,124 B1 | 7/2001 | Crockett et al. ............. 711/162 | |
| 6,272,545 B1 | 8/2001 | Flanagin et al. ............ 709/228 | |
| 6,275,831 B1 | 8/2001 | Bodnar et al. ............ 707/201 | |
| 6,278,941 B1 | 8/2001 | Yokoyama .................. 701/209 | |
| 6,282,435 B1 | 8/2001 | Wagner et al. .............. 455/566 | |
| 6,282,698 B1 | 8/2001 | Baker et al. .................. 717/1 | |
| 6,285,889 B1 | 9/2001 | Nykanen et al. ............ 455/557 | |
| 6,286,029 B1 | 9/2001 | Delph | |
| 6,286,053 B1 | 9/2001 | Van Peursem et al. .................. 709/999.999 | |
| 6,286,085 B1 | 9/2001 | Jouenne et al. ............ 711/162 | |
| 6,292,743 B1 | 9/2001 | Pu et al. .................... 455/456 | |
| 6,292,905 B1 | 9/2001 | Wallach et al. .................. 714/4 | |
| 6,295,502 B1 | 9/2001 | Hancock et al. ............ 701/200 | |
| 6,295,541 B1 | 9/2001 | Bodnar et al. ............ 707/203 | |
| 6,304,881 B1 | 10/2001 | Halim et al. ............ 707/201 | |
| 6,317,755 B1 | 11/2001 | Rakers et al. ............... 707/204 | |
| 6,321,236 B1 | 11/2001 | Zollinger et al. ............ 707/201 | |
| 6,324,467 B1 | 11/2001 | Machii et al. ............ 701/200 | |
| 6,324,526 B1 | 11/2001 | D'Agostino .................. 705/44 | |
| 6,324,544 B1 | 11/2001 | Alam et al. .................. 707/201 | |
| 6,327,533 B1 | 12/2001 | Chou ........................ 340/988 | |
| 6,329,680 B1 | 12/2001 | Yoshida et al. .............. 257/296 | |
| 6,330,568 B1 | 12/2001 | Boothby et al. ............ 707/201 | |
| 6,332,158 B1 | 12/2001 | Risley et al. ................. 709/219 | |
| 6,333,973 B1 | 12/2001 | Smith et al. ............... 379/88.12 | |
| 6,338,096 B1 | 1/2002 | Ukelson ...................... 719/319 | |
| 6,339,710 B1 | 1/2002 | Suzuki ...................... 455/458 | |
| 6,341,316 B1 | 1/2002 | Kloba et al. ................. 709/248 | |
| 6,345,308 B1 | 2/2002 | Abe .......................... 709/248 | |
| 6,349,336 B1 | 2/2002 | Sit et al. | |
| 6,353,448 B1 | 3/2002 | Scarborough et al. ........ 345/349 | |
| 6,356,910 B1 | 3/2002 | Zellweger .................. 707/100 | |
| 6,356,961 B1 | 3/2002 | Oprescu-Surcobe | |
| 6,360,252 B1 | 3/2002 | Rudy et al. .................. 709/206 | |
| 6,360,330 B1 | 3/2002 | Mutalik et al. .................. 714/4 | |
| 6,363,249 B1 | 3/2002 | Nordeman et al. ........... 455/418 | |
| 6,363,391 B1 * | 3/2002 | Rosensteel, Jr. .................. 1/1 | |
| 6,363,412 B1 | 3/2002 | Niwa et al. .................. 709/203 | |
| 6,374,250 B2 | 4/2002 | Ajtai et al. .................. 707/101 | |
| 6,381,700 B1 | 4/2002 | Yoshida ...................... 713/201 | |
| 6,389,462 B1 | 5/2002 | Cohen et al. .................. 709/218 | |
| 6,396,482 B1 | 5/2002 | Griffin et al. ................. 345/169 | |
| 6,397,307 B2 | 5/2002 | Ohran ........................ 711/161 | |
| 6,397,351 B1 | 5/2002 | Miller et al. .................. 714/13 | |
| 6,401,104 B1 | 6/2002 | LaRue et al. ................. 707/203 | |
| 6,405,218 B1 | 6/2002 | Boothby ...................... 707/201 | |
| 6,418,309 B1 | 7/2002 | Moon et al. .................. 455/418 | |
| 6,434,627 B1 | 8/2002 | Millet et al. .................. 709/245 | |
| 6,437,818 B1 | 8/2002 | Ludwig et al. ............ 348/14.09 | |
| 6,449,622 B1 | 9/2002 | LaRue et al. ................. 707/201 | |
| 6,453,392 B1 | 9/2002 | Flynn, Jr. .................... 711/151 | |
| 6,457,062 B1 | 9/2002 | Pivowar et al. .............. 709/248 | |
| 6,460,036 B1 | 10/2002 | Herz ........................ 707/10 | |
| 6,462,644 B1 | 10/2002 | Howell et al. | |
| 6,463,464 B1 | 10/2002 | Lazaridis et al. ............ 709/207 | |
| 6,466,967 B2 | 10/2002 | Landsman et al. ........... 709/203 | |
| 6,473,621 B1 | 10/2002 | Heie ........................ 455/466 |
| 6,480,896 B1 | 11/2002 | Brown et al. ................. 709/231 |
| 6,484,143 B1 | 11/2002 | Swildens et al. ................. 705/1 |
| 6,487,560 B1 | 11/2002 | LaRue et al. ................. 707/203 |
| 6,490,655 B1 | 12/2002 | Kershaw ...................... 711/151 |
| 6,496,944 B1 | 12/2002 | Hsiao et al. .................. 714/15 |
| 6,499,108 B1 | 12/2002 | Johnson ...................... 713/201 |
| 6,507,891 B1 | 1/2003 | Challenger et al. .......... 711/122 |
| 6,516,327 B1 | 2/2003 | Zondervan et al. .......... 707/200 |
| 6,519,452 B1 | 2/2003 | Agostino et al. |
| 6,523,063 B1 | 2/2003 | Miller et al. ................. 709/206 |
| 6,523,079 B2 * | 2/2003 | Kikinis et al. ............... 710/303 |
| 6,532,588 B1 | 3/2003 | Porter |
| 6,535,743 B1 | 3/2003 | Kennedy, III et al. ..... 455/456.1 |
| 6,539,494 B1 | 3/2003 | Abramson et al. .............. 714/4 |
| 6,542,933 B1 | 4/2003 | Durst, Jr. et al. ............. 709/229 |
| 6,546,425 B1 * | 4/2003 | Hanson et al. ................. 709/227 |
| 6,549,933 B1 | 4/2003 | Barrett et al. ................. 709/203 |
| 6,553,375 B1 * | 4/2003 | Huang et al. .................. 707/10 |
| 6,553,410 B2 | 4/2003 | Kikinis ...................... 709/218 |
| 6,553,413 B1 | 4/2003 | Leighton et al. ............. 709/219 |
| 6,567,850 B1 | 5/2003 | Freishtat et al. .............. 709/224 |
| 6,567,857 B1 | 5/2003 | Gupta et al. |
| 6,581,065 B1 | 6/2003 | Rodkin et al. ................. 707/102 |
| 6,584,454 B1 | 6/2003 | Hummel et al. ................. 705/59 |
| 6,589,290 B1 | 7/2003 | Maxwell et al. .............. 707/507 |
| 6,591,266 B1 | 7/2003 | Li et al. ...................... 707/10 |
| 6,591,306 B1 | 7/2003 | Redlich ...................... 709/245 |
| 6,591,362 B1 | 7/2003 | Li .................................. 713/1 |
| 6,597,700 B2 | 7/2003 | Golikeri et al. ............. 370/401 |
| 6,601,143 B1 | 7/2003 | Lamparter |
| 6,609,005 B1 | 8/2003 | Chern ........................ 455/457 |
| 6,628,194 B1 | 9/2003 | Hellebust et al. |
| 6,636,894 B1 | 10/2003 | Short et al. .................. 709/225 |
| 6,640,302 B1 | 10/2003 | Subramaniam et al. ...... 713/169 |
| 6,643,707 B1 | 11/2003 | Booth ........................ 709/245 |
| 6,647,399 B2 | 11/2003 | Zaremba |
| 6,654,746 B1 | 11/2003 | Wong et al. .................. 707/10 |
| 6,665,721 B1 | 12/2003 | Hind et al. |
| 6,671,724 B1 | 12/2003 | Pandya et al. ................. 709/226 |
| 6,671,757 B1 | 12/2003 | Multer et al. ................. 710/100 |
| 6,684,206 B2 | 1/2004 | Chen et al. .................... 706/61 |
| 6,684,302 B2 | 1/2004 | Kershaw ...................... 711/151 |
| 6,694,335 B1 | 2/2004 | Hopmann et al. ............ 707/200 |
| 6,694,336 B1 | 2/2004 | Multer et al. ................. 707/100 |
| 6,701,316 B1 | 3/2004 | Li et al. ...................... 707/10 |
| 6,704,849 B2 | 3/2004 | Steegmans ................... 711/162 |
| 6,714,987 B1 | 3/2004 | Amin et al. .................. 709/249 |
| 6,718,348 B1 | 4/2004 | Novak et al. ................. 707/201 |
| 6,718,390 B1 | 4/2004 | Still et al. .................... 709/229 |
| 6,725,239 B2 | 4/2004 | Sherman et al. ............. 707/201 |
| 6,728,530 B1 | 4/2004 | Heinonen et al. .......... 455/414.1 |
| 6,732,101 B1 | 5/2004 | Cook .......................... 707/10 |
| 6,732,264 B1 | 5/2004 | Sun et al. ...................... 713/2 |
| 6,738,789 B2 | 5/2004 | Multer et al. ................. 707/201 |
| 6,741,851 B1 | 5/2004 | Lee et al. |
| 6,745,040 B2 | 6/2004 | Zimmerman ................. 455/458 |
| 6,757,696 B2 | 6/2004 | Multer et al. ................. 707/201 |
| 6,757,698 B2 | 6/2004 | Davidson et al. ............. 707/204 |
| 6,757,712 B1 * | 6/2004 | Bastian et al. ................. 709/206 |
| 6,781,575 B1 | 8/2004 | Hawkins et al. .............. 345/173 |
| 6,795,848 B1 | 9/2004 | Border et al. ................. 709/213 |
| 6,799,214 B1 | 9/2004 | Li ................................ 709/226 |
| 6,804,690 B1 | 10/2004 | Dysert et al. ................. 707/204 |
| 6,804,783 B1 | 10/2004 | Wesinger, Jr. et al. ........ 713/200 |
| 6,810,411 B1 | 10/2004 | Coughlin et al. |
| 6,812,961 B1 | 11/2004 | Parulski et al. ............. 348/231.2 |
| 6,813,487 B1 | 11/2004 | Trommelen |
| 6,816,481 B1 | 11/2004 | Adams et al. ................. 370/352 |
| 6,829,654 B1 | 12/2004 | Jungck |
| 6,836,657 B2 | 12/2004 | Ji et al. |
| 6,836,765 B1 | 12/2004 | Sussman ...................... 705/41 |
| 6,839,022 B1 | 1/2005 | Benco et al. |

| | | | | | | |
|---|---|---|---|---|---|---|
| 6,839,568 B2 | 1/2005 | Suzuki ............... 455/550.1 | 2001/0028363 A1 | 10/2001 | Nomoto et al. | |
| 6,842,695 B1 | 1/2005 | Tu et al. ............... 701/213 | 2001/0044805 A1 | 11/2001 | Multer et al. ........... 707/201 |
| 6,850,944 B1 | 2/2005 | MacCall et al. ......... 707/100 | 2001/0047471 A1 | 11/2001 | Johnson ................. 713/1 |
| 6,868,451 B1 | 3/2005 | Peacock ............... 709/231 | 2001/0051920 A1 | 12/2001 | Joao et al. .............. 705/41 |
| 6,870,921 B1 | 3/2005 | Elsey et al. ........... 379/218.01 | 2002/0007303 A1 | 1/2002 | Brookler et al. .......... 705/10 |
| 6,886,013 B1 | 4/2005 | Beranek .............. 707/10 | 2002/0010868 A1 | 1/2002 | Nakashima et al. ....... 713/201 |
| 6,892,225 B1 | 5/2005 | Tu et al. .............. 709/217 | 2002/0016818 A1 | 2/2002 | Kirani et al. ............ 709/206 |
| 6,892,245 B1 | 5/2005 | Crump et al. .......... 709/245 | 2002/0016912 A1 | 2/2002 | Johnson ................ 713/165 |
| 6,904,449 B1 | 6/2005 | Quinones | 2002/0032751 A1* | 3/2002 | Bharadwaj ............. 709/218 |
| 6,904,460 B1 | 6/2005 | Raciborski et al. ....... 709/224 | 2002/0040369 A1 | 4/2002 | Multer et al. ........... 707/200 |
| 6,920,488 B1 | 7/2005 | Le Pennec et al. ....... 709/219 | 2002/0049852 A1 | 4/2002 | Lee et al. ............. 709/231 |
| 6,925,476 B1 | 8/2005 | Multer ................ 707/200 | 2002/0055909 A1 | 5/2002 | Fung et al. ............. 705/42 |
| 6,925,477 B1 | 8/2005 | Champagne et al. ...... 707/203 | 2002/0056011 A1 | 5/2002 | Nardone et al. .......... 709/248 |
| 6,934,767 B1 | 8/2005 | Jellinek ............... 709/247 | 2002/0059116 A1 | 5/2002 | Bulatovic et al. ......... 705/27 |
| 6,944,651 B2 | 9/2005 | Onyon et al. .......... 709/217 | 2002/0062365 A1 | 5/2002 | Nishikawa et al. ........ 709/223 |
| 6,944,676 B1 | 9/2005 | Armbruster et al. ...... 709/243 | 2002/0067816 A1 | 6/2002 | Bushnell |
| 6,954,660 B2 | 10/2005 | Aoyama | 2002/0073212 A1 | 6/2002 | Sokol et al. ............ 709/229 |
| 6,954,783 B1 | 10/2005 | Bodwell et al. ......... 709/218 | 2002/0078075 A1 | 6/2002 | Colson et al. ........... 707/204 |
| 6,959,331 B1 | 10/2005 | Traversat et al. | 2002/0082995 A1 | 6/2002 | Christie, IV ............ 705/44 |
| 6,963,914 B1 | 11/2005 | Breitbart et al. ......... 709/226 | 2002/0083325 A1 | 6/2002 | Mediratta et al. ......... 713/191 |
| 6,973,299 B2 | 12/2005 | Apfel | 2002/0091785 A1 | 7/2002 | Ohlenbusch et al. ....... 709/208 |
| 6,996,617 B1 | 2/2006 | Aiken, Jr. et al. | 2002/0116444 A1 | 8/2002 | Chaudhri et al. ......... 709/201 |
| 6,996,631 B1 | 2/2006 | Aiken, Jr. et al. ........ 709/242 | 2002/0120600 A1 | 8/2002 | Schiavone et al. ........ 707/1 |
| 7,003,555 B1 | 2/2006 | Jungck ................ 709/219 | 2002/0128908 A1 | 9/2002 | Levin et al. ............ 705/14 |
| 7,003,668 B2 | 2/2006 | Berson et al. .......... 713/182 | 2002/0138582 A1 | 9/2002 | Chandra et al. .......... 709/206 |
| 7,007,041 B2 | 2/2006 | Multer et al. .......... 707/201 | 2002/0138765 A1 | 9/2002 | Fishman et al. .......... 713/201 |
| 7,010,578 B1 | 3/2006 | Lewin et al. | 2002/0152278 A1 | 10/2002 | Pontenzone et al. |
| 7,016,964 B1 | 3/2006 | Still et al. | 2002/0162011 A1 | 10/2002 | Tanaka et al. ........... 713/200 |
| 7,023,868 B2 | 4/2006 | Rabenko et al. ......... 370/419 | 2002/0168964 A1 | 11/2002 | Kraft |
| 7,030,730 B1 | 4/2006 | Zondervan | 2003/0021274 A1 | 1/2003 | Siikaniemi et al. |
| 7,035,878 B1 | 4/2006 | Multer et al. .......... 707/201 | 2003/0028451 A1 | 2/2003 | Ananian ............... 705/27 |
| 7,039,656 B1 | 5/2006 | Tsai et al. ............. 707/201 | 2003/0028554 A1 | 2/2003 | Koskimies et al. ........ 707/201 |
| 7,051,275 B2 | 5/2006 | Gupta et al. ........... 715/512 | 2003/0037020 A1 | 2/2003 | Novak et al. ........... 707/1 |
| 7,054,594 B2 | 5/2006 | Bloch et al. ........... 455/41.2 | 2003/0061163 A1 | 3/2003 | Durfield ............... 705/44 |
| 7,054,952 B1 | 5/2006 | Schwerdtfeger et al. | 2003/0065934 A1 | 4/2003 | Angelo et al. ........... 713/200 |
| 7,082,476 B1 | 7/2006 | Cohen et al. | 2003/0069874 A1 | 4/2003 | Hertzog et al. .......... 707/1 |
| 7,085,817 B1 | 8/2006 | Tock et al. | 2003/0084121 A1 | 5/2003 | De Boor et al. .......... 709/218 |
| 7,096,418 B1 | 8/2006 | Singhal et al. | 2003/0134625 A1 | 7/2003 | Choi .................. 455/418 |
| 7,099,915 B1 | 8/2006 | Tenereillo et al. | 2003/0135463 A1 | 7/2003 | Brown et al. ........... 705/44 |
| 7,103,794 B2 | 9/2006 | Malcolm et al. | 2003/0139172 A1 | 7/2003 | Lampela et al. .......... 455/415 |
| 7,107,043 B2 | 9/2006 | Aoyama | 2003/0204568 A1 | 10/2003 | Bhargava et al. ......... 709/206 |
| 7,110,954 B2 | 9/2006 | Yung et al. | 2004/0054746 A1 | 3/2004 | Shibata ............... 709/207 |
| 7,116,681 B1 | 10/2006 | Hovell et al. .......... 370/466 | 2004/0093385 A1 | 5/2004 | Yamagata ............. 709/206 |
| 7,146,161 B2 | 12/2006 | Chou | 2004/0120477 A1 | 6/2004 | Nguyen et al. |
| 7,162,494 B2 | 1/2007 | Arellano ............... 707/104.1 | 2004/0148408 A1 | 7/2004 | Nadarajah |
| 7,167,728 B1 | 1/2007 | Wagner et al. .......... 455/566 | 2004/0204120 A1 | 10/2004 | Jiles |
| 7,181,628 B2 | 2/2007 | Sato et al. | 2004/0224665 A1 | 11/2004 | Kokubo ............... 455/411 |
| 7,197,574 B1 | 3/2007 | Ishiyama .............. 709/245 | 2005/0090253 A1 | 4/2005 | Kim et al. ............. 455/435.1 |
| 7,233,791 B2 | 6/2007 | Gilbert et al. .......... 455/419 | 2005/0227674 A1 | 10/2005 | Kopra et al. |
| 7,237,027 B1 | 6/2007 | Raccah et al. | 2005/0240494 A1 | 10/2005 | Cue et al. |
| 7,249,175 B1 | 7/2007 | Donaldson ............ 709/225 | 2005/0273632 A1 | 12/2005 | Kawakami |
| 7,269,433 B2 | 9/2007 | Vargas et al. .......... 455/502 | 2006/0190626 A1 | 8/2006 | Bhogal et al. ........... 709/248 |
| 7,284,051 B1 | 10/2007 | Okano et al. .......... 709/226 | 2006/0212482 A1 | 9/2006 | Celik |
| 7,289,964 B1 | 10/2007 | Bowman-Amuah ....... 705/1 | 2007/0050734 A1 | 3/2007 | Busey ................. 715/853 |
| 7,293,074 B1 | 11/2007 | Jellinek et al. .......... 709/205 | 2008/0009268 A1 | 1/2008 | Ramer et al. |
| 7,315,826 B1 | 1/2008 | Guheen et al. .......... 705/7 | 2008/0022220 A1 | 1/2008 | Cheah ................ 715/769 |
| 7,317,907 B2 | 1/2008 | Linkert et al. | 2008/0039020 A1 | 2/2008 | Eskin ................. 455/41.2 |
| 7,343,568 B2 | 3/2008 | Jiang et al. | | | |
| 7,349,719 B2 | 3/2008 | Buniatyan | | FOREIGN PATENT DOCUMENTS | |
| 7,356,559 B1 | 4/2008 | Jacobs et al. .......... 709/203 | | | |
| 7,363,233 B1 | 4/2008 | Levine ................ 705/1 | CN | 1455522 | 11/2003 |
| 7,383,061 B1 | 6/2008 | Hawkins | CN | 1313697 A | 2/2005 |
| 7,392,034 B2 | 6/2008 | Westman et al. ........ 455/402 | EP | 0801487 A2 | 10/1997 |
| 7,415,486 B2 | 8/2008 | Multer et al. .......... 709/201 | EP | 0836131 A2 | 4/1998 |
| 7,440,746 B1 | 10/2008 | Swan | EP | 0836301 A1 | 4/1998 |
| 7,447,743 B1 | 11/2008 | Jordan, Jr. ............ 709/206 | EP | 0924917 A2 | 6/1999 |
| 7,454,500 B1 | 11/2008 | Hsu et al. ............ 709/226 | EP | 0930593 A1 | 7/1999 |
| 7,499,888 B1 | 3/2009 | Tu et al. ............. 705/44 | EP | 1024441 A2 | 2/2000 |
| 7,505,762 B2 | 3/2009 | Onyon et al. .......... 455/419 | EP | 0986225 A1 | 3/2000 |
| 7,519,702 B1 | 4/2009 | Allan | EP | 1139608 A2 | 10/2001 |
| 7,596,609 B1 | 9/2009 | Refuah et al. | EP | 1180890 A2 | 2/2002 |
| 7,663,652 B1 | 2/2010 | Reese | EP | 1263244 A2 | 4/2002 |
| 2001/0014893 A1 | 8/2001 | Boothby ............. 707/201 | GB | 2366050 A | 6/2001 |

| | | |
|---|---|---|
| JP | 10191453 | 7/1998 |
| JP | 11242620 | 9/1999 |
| JP | 11242677 | 9/1999 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |
| WO | WO 99/05813 | 2/1999 |
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | 0133874 A1 | 5/2001 |
| WO | WO 01/71539 | 9/2001 |
| WO | WO 01/80535 A1 | 9/2001 |
| WO | 0217140 A2 | 2/2002 |
| WO | 03-083716 A1 | 10/2003 |
| WO | WO 2005/112586 A2 | 12/2005 |

OTHER PUBLICATIONS

Chase, Larry, "Taking Transactions Online," Oct. 1998, pp. 124-132, Target Marketing, v.21 No. 10.

Gong, Li, "Increasing Availability and Security of an Authentication Service," Jun. 1993, pp. 657-662, IEEE Journal on Selected Areas in Communications, v. 11 No. 5.

DeMaio, Harry B., "My MIPS Are Sealed," Sep./Oct. 1993, pp. 46-51, Chief Information Officer Journal, v. 5 issue 7.

Internet Mail Consortium: :vCard Overview, Oct. 13, 1998, 3 pages, Retrieved from the Internet.

Internet Mail Consortium: :vCard The Electronic Business Card, Jan. 1, 1997, 5 pages, Retrieved from the Internet.

Reed, Benjamin C., et al.,"Authenticating Network-Attached Storage," IEEE, Jan.-Feb.2000, pp. 49-57.

Gaskin .J.E.:Messaging-Instant Enterprise- Once a Novelty item, IM is Becoming a More Serious Tool for Business Users, InternetWeek, No. 810, Apr. 24, 2000, p. 55.

BusinessWire, "FusionOne Partners with WhitePages.com to Deliver Automatic Synchronization for Online Subscriber," press release, Oct. 11, 2000.

Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.

Patel et al.,"The Multimedia Fax-MIME Gateway," 8440 IEEE MultiMedia No. 4, Jan. 1994, 7 pgs.

Lamb et al.,"LAN-Based Office for the Enterprise, A Case Study," Advantis Company, White Plains, NY 10605, Jan. 1994 IEEE, pp. 440-447.

Rou et al., "Online File Storage System," 2002 Student Conference on Research and Development Proceedings, Shah Alam, Malaysia, Nov. 7, 2002, IEEE, pp. 83-86.

Agarwal et al., "On the Scalability of Data Synchronization Protocols for PDAs and Mobile Devices," Jul. 2002, IEEE Network, pp. 22-28.

* cited by examiner

REMOTE ACCESS COMMUNICATION ARCHITECTURE APPARATUS AND METHOD

BACKGROUND OF THE INVENTION

1. Field of the Invention

The present invention relates generally to remote access systems. More particularly, the present invention relates to an apparatus and method for implementing a communication architecture for remotely accessing a computer by means of a remote device without the need for special software applications on the remote device.

2. The Prior Art

In general, remote access systems allow a "remote" user (from a remote computer) to connect to and access resources on another computer. For example, a user on a mobile computer may connect to and access resources on a home computer via conventional remote access systems. However, prior art remote access systems require special application software to be supplied to both the remote system and the base system. Due to this shortcoming, most prior art remote access systems are limited to devices including substantial computing capabilities in the remote computer. Also, access to another computer via a remote access system is provided using conventional data connection means, typically through a PSTN (public switched telephone network) connection. That is, a direct connection from the remote computer to the base computer is typically required for security reasons.

Remote access systems can generally be categorized into two types of systems. The first system is generally referred to as a remote access server (RAS) system. A RAS system usually comprises server RAS software residing on a RAS server and client RAS software residing on a "remote" computer. The RAS server is coupled to resources (e.g., printers, files, other nodes) which are remotely accessed by a user of the system. In operation, a user of the remote computer connects to the RAS server via a dial-in telephone connection. Upon connection, the RAS server queries for the user's access credentials (e.g., user name and password). Upon authentication of the user's access credentials, the user is granted access to resources on the RAS server and/or resources on other nodes connected to the RAS server to which the user is authorized access. The RAS software manages the connection process, the authentication process, the access privileges, and the data transfers between the RAS server and the remote computer. RAS systems are also used by commercial service providers, such as Internet Access Providers (ISPs) to allow their customers access into their network resources.

In another implementation, RAS systems may be used in conjunction with an Internet connection. In this scheme, a user is able to access a RAS server indirectly via the Internet, rather than directly via a point to point telephone connection. These RAS systems are generally referred to as virtual private networks (VPNs), because a secure channel is provided via the normally unsecured Internet. In VPNs, a remote user having a computer operatively coupled to the VPN, is able to access resources on another computer via the Internet using Internet protocols.

The other type of remote access system is generally referred to as a remote control system (RCS). RCSs allow a remote user to not only access resources on another "host" computer, but also allow the user to control the host computer. RCSs typically display on the remote computer what would normally be displayed on the host computer (known as screen emulation). In this way, the user is able to control the host computer from the remote computer as if the user was directly accessing the host computer. An example of a commercially available RCS product is PC Anywhere™ by Symantec Corp.™. Like RAS systems, RCS allows a remote user to connect via a conventional means, including a telephone connection and via the Internet. Again, special software is required on both nodes.

There are several disadvantages with RAS and RCS systems. In RAS systems, file synchronization poses a common problem, particularly with respect to email applications. For example, where a remote user downloads email to the remote computer it may be stored on the remote computer. Thus, when the user gets back to the local computer, that email is not accessible on the remote computer, but must somehow be transferred from the remote computer or disregarded. This can become quite frustrating to the user.

In addition, in RAS implementations certain files may be unusable without the original application. For example, with certain email applications, the messages associated with the email application are commonly stored in a proprietary file format. Without the original email application, the file would be unusable to the remote user if the original application is not installed on the remote computer accessed by the user.

RCS, on the other hand, typically requires proprietary software to be installed on both the server (host) and client (remote) computers. Proprietary software limits the ability of a remote user to access the host computer, because such proprietary software may not be readily accessible.

In addition, often the setup and administration of RAS and RCS systems are cumbersome or otherwise overwhelming for the home or corporate users. Setup normally involves the assistance of a network system administrator and is usually complicated further by the fact that each user may have different remote computers and different host computers. Each setup then becomes unique and difficult.

BRIEF DESCRIPTION OF THE INVENTION

Accordingly, there is a need for a method and apparatus which provides for remote and secure access to a host or base computer, and which further provides an open application standard for client access to the host computer. The present invention satisfies these needs, as well as others, and generally overcomes the deficiencies found in the background art.

Thus, it is desirable to have an open application standard (such as a conventional world wide web (web) browser), particularly on the client side, whereby a mobile user may access a plurality of data processing means (computers, Internet terminals, PDAs, mobile telephones, etc.).

To overcome the above described and other shortcomings of the prior art, disclosed herein is an apparatus and method for remotely accessing a base computer. The remote access device may be any device capable of accessing the internet and does not require the installation of specialty software thereon. The base computer operates by means of an agent that communicates with a central server system.

A user of the system may access a base computer from a remote device such as a laptop computer, cellular telephone, palm pilot, or any other device capable of accessing the internet. A browser interface on a laptop computer for example is all that would be required for a laptop computer. The laptop user would then access the central server system web site and be provided with one or more tasks that the user may desire to perform. Such tasks may include checking email on the base computer, obtaining files from the base computer, copying files from the remote computer to the base computer, or accessing an address book on the base computer.

The base computer intermittently contacts the central server system to determine whether the central server system has established a session with a remote user. When a session has been established between a remote user and the central server system, the central server system replies to the base computers next intermittent request with an IP address and port number for the base computer to establish a socket connection. The IP address and port number correspond to a server in the central server system handling the particular session task requests. That socket connection will be maintained between the base computer and the server until the server ends the session or a predefined timeout period expires.

While the socket connection is maintained, the base computer "listens" for tasks from the server. It should be noted that because of the intermittent initial contacts from the base computer to the central server system, operation of this system will be allowed, even in the presence of a firewall (i.e. a firewall between the base computer and the internet is intended to preclude a signal from an outside source coming through the firewall unless requested, but will allow outgoing signals; thus, a message sent from a base computer to a web server would be allowed through a firewall along with any response to said message). Likewise, since the base computer establishes the continuous connection with the IP socket and port number of the server in question after being informed of same from the central server system in response to one of the intermittent contacts, a firewall is not a problem. Thus, once a task is selected by a remote user, the central server system via the connected server (to the base computer) transmits the task request to the base computer and the base computer provides the data and/or files necessary to fulfill that request in response back to the central server system.

The central server system then, in turn, presents the requested data to the remote user in an internet readable form. For instance, in the laptop computer example, the information is presented in a browser readable format such as HTML. For a cellular device on the other hand, a WAP (Wireless Application Protocol) would be used to present such information to the cellular device user via the cellular device display (HDML, WML, etc.). Additionally, the communications between the remote device and the central server system are preferably conducted via a secure sockets layer (SSL) for security purposes, and the communications between the base computer and the central server system are preferably conducted via a proprietary protocol utilizing encryption as well to also ensure security.

Therefore, it is a first object of the present invention to provide a system for remotely accessing a base computer without the necessity of specialty software on the remote device.

It is another object of the present invention to provide a system for remotely accessing a base computer wherein the remote device communicates solely with an internet server system and the base computer communicates solely with the internet server system.

It is yet another object of the present invention to provide a system for remotely accessing a base computer via the internet in a manner that is highly secure.

It is yet another object of the present invention to provide a method for both remotely accessing a base computer that is continuously connected to the internet and one which is not continuously connected to the internet.

It is yet another object of the present invention to provide a remote access system that will work even though the base computer may reside behind a firewall.

Viewed from a first vantage point a method for remotely accessing a base computer from internet-enabled remote devices wherein the remote devices do not include remote access software is disclosed, comprising in combination, establishing a remote access session with one of the remote devices at an internet central server system, presenting a task list to the remote device from said central server system, receiving a task selection at said central server system from the remote device, establishing a persistent connection between said central server system and a base computer in response to intermittent contact from said base computer to said central server system, transmitting said task from said central server system to the base computer via said connection between said central server system and said base computer, receiving at said central server system task data from the base computer responsive to said transmitted task, and presenting from said central server system a task response compiled from said task data to the remote device.

Viewed from another vantage point a remote access system is disclosed comprising in combination a central server system in operative communication with the internet, an internet server for communicating with remote devices, the internet server comprising one server within the central server system, a task transmitter within the central server system for transmitting tasks to base computers; and a task data receiver within the central server system for receiving task data from base computers.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons having the benefit of this disclosure.

Figure 1:
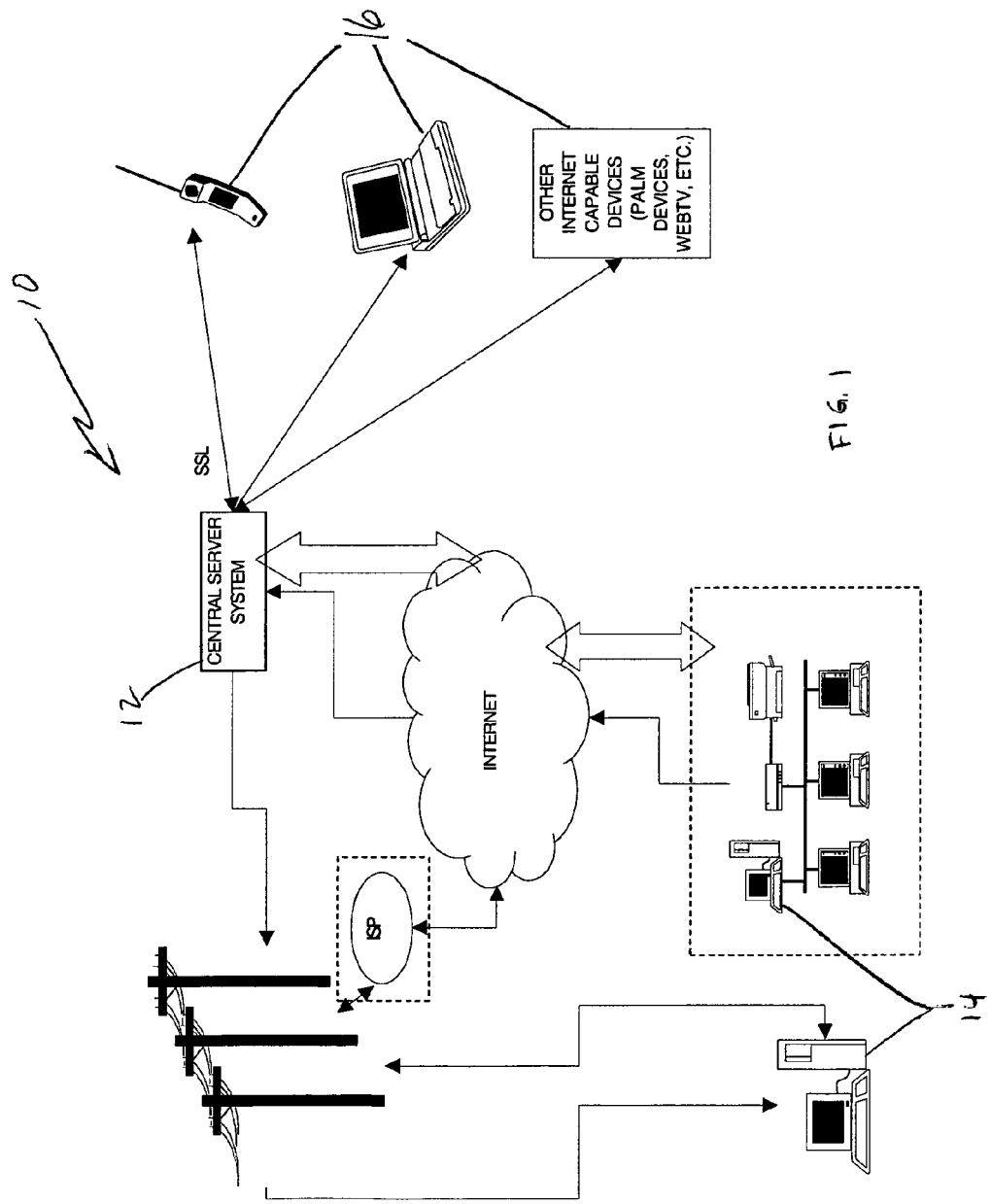
FIG. 1 is a schematic diagram of an overview of the present invention.

Referring to the drawing figures, wherein like numerals denote like parts throughout the various drawing figures, FIG. 1 is directed to the remote access system 10 of the present invention. Generally, the remote access system 10 includes a central server system 12 that may be in operative communication with a remote device 16. Additionally, a base computer 14 may be continuously or non-continuously in operative communication with central server system 12. Furthermore, the central server system 12 may consist of one or more servers. A multiple server configuration would allow for the handling of certain discreet operations by different servers and is preferred. For instance, one server may be configured as a web site server, while another may be configured to communicate in a manner understood by cellular phones, and yet another for PDA's, and so forth.

The essence of the system is to enable a remote device 16 to retrieve data from, or provide data to, a base computer 14 with the assistance of central server system 12. No special software is installed on the remote device 16. To the contrary, remote device 16 may be any device capable of accessing the internet which includes a readable interface such as a computer, mobile telephone, palm device, webTV, or any other such device.

A remote user using a remote device 16 may connect to the central server system 12 as the user might connect to any other internet site. Once connected (and authenticated), that user will then be presented with task options by the central server system in an internet readable format (HTML for mobile computer user using a browser for instance) by the device being used. The user will then select the task desired at which time the central server system 12 will transmit the task to base computer 14.

The base computer 14, via an agent installed thereon, will contact the central server 12 from time to time to determine if a remote user session has been established. Application entitled AGENT SYSTEM FOR A SECURE REMOTE ACCESS SYSTEM, filed Jul. 19, 2000, U.S. application Ser. No. 09/618,955, now U.S. Pat. No. 6,892,225, describes more fully this method, system, and apparatus of implementing the agent and is expressly incorporated herein by reference. Thus, the base computer 14 intermittently contacts the central server system 12 to determine whether the central server system 12 has established a session with a remote user. When a session has been established between a remote device 16 and the central server system 12, the central server system 12 replies to the base computers next intermittent contact with an IP address and port number for the base computer 14 to establish a socket connection with a server in the central server system 12. The IP address and port number correspond to a server in the central server system 12 handling the particular session task requests. That socket connection will be maintained between the base computer 14 and the server until the server ends the session or a predefined timeout period expires.

While the socket connection is maintained, the base computer 14 "listens" for tasks from the server. It should be noted that because of the intermittent initial contacts from the base computer 14 to the central server system 12, operation of this system will be allowed, even in the presence of a firewall (i.e. a firewall between the base computer 14 and the internet is intended to preclude a signal from an outside source coming through the firewall unless requested, but will allow outgoing signals; thus, a message sent from a base computer 14 to a web server would be allowed through a firewall along with any response to said message). Likewise, since the base computer 14 establishes the continuous connection with the IP address and port number of the server in question after being informed of same from the central server system 12 in response to one of the intermittent contacts, a firewall is not a problem.

Thus, once a task is selected by a remote user via remote device 16, the central server system 12 via the connected server (to the base computer) transmits the task request to the base computer 14 and the base computer 14 provides the data and/or files necessary to fulfill that request in response back to the central server system 12. Then, the central server system will present the task information/data to the remote device 16 in a manner readable by remote device 16.

Figure 2:
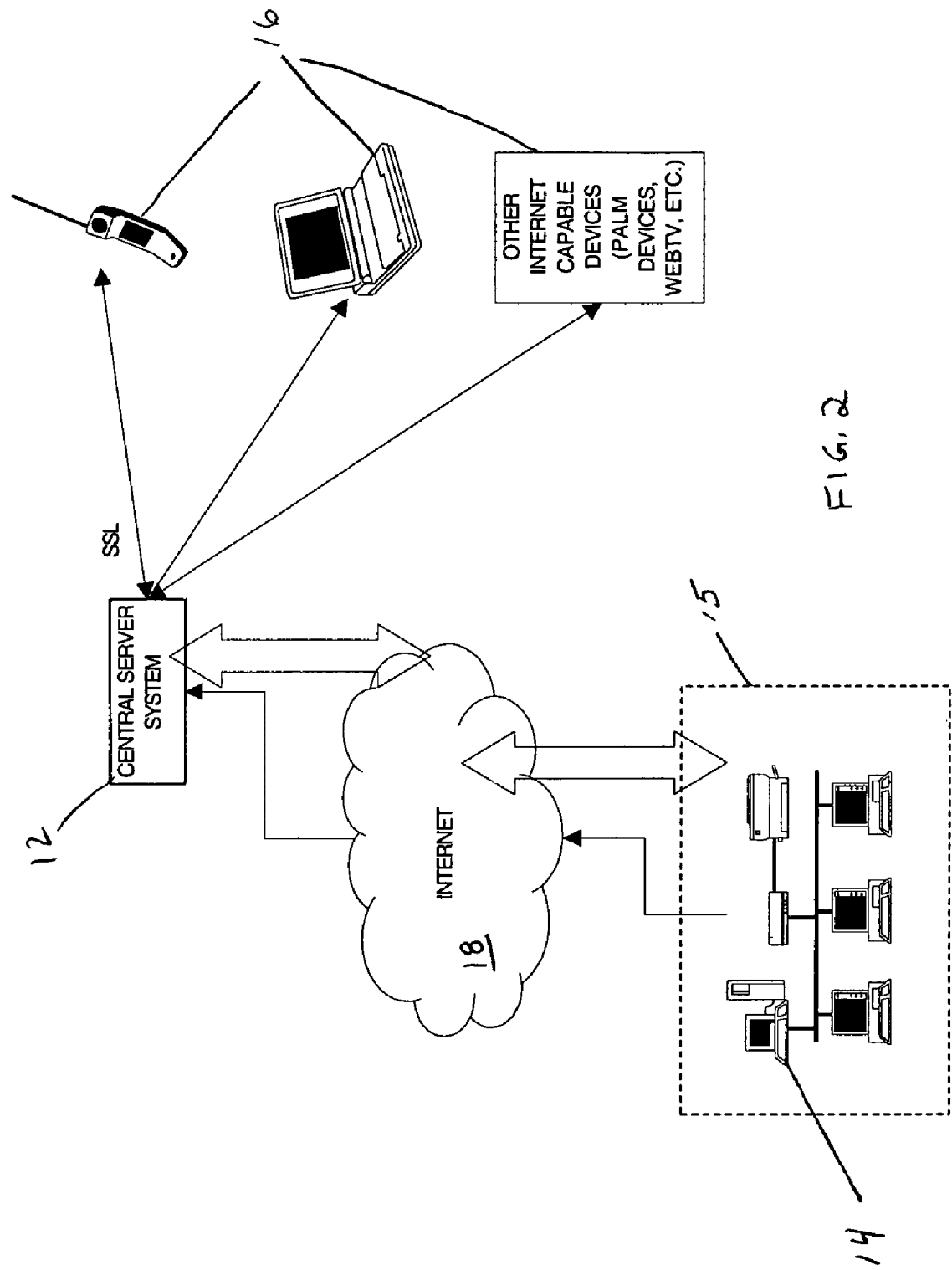
FIG. 2 is a schematic diagram of the present invention in a continuous connection environment.
Figure 4:
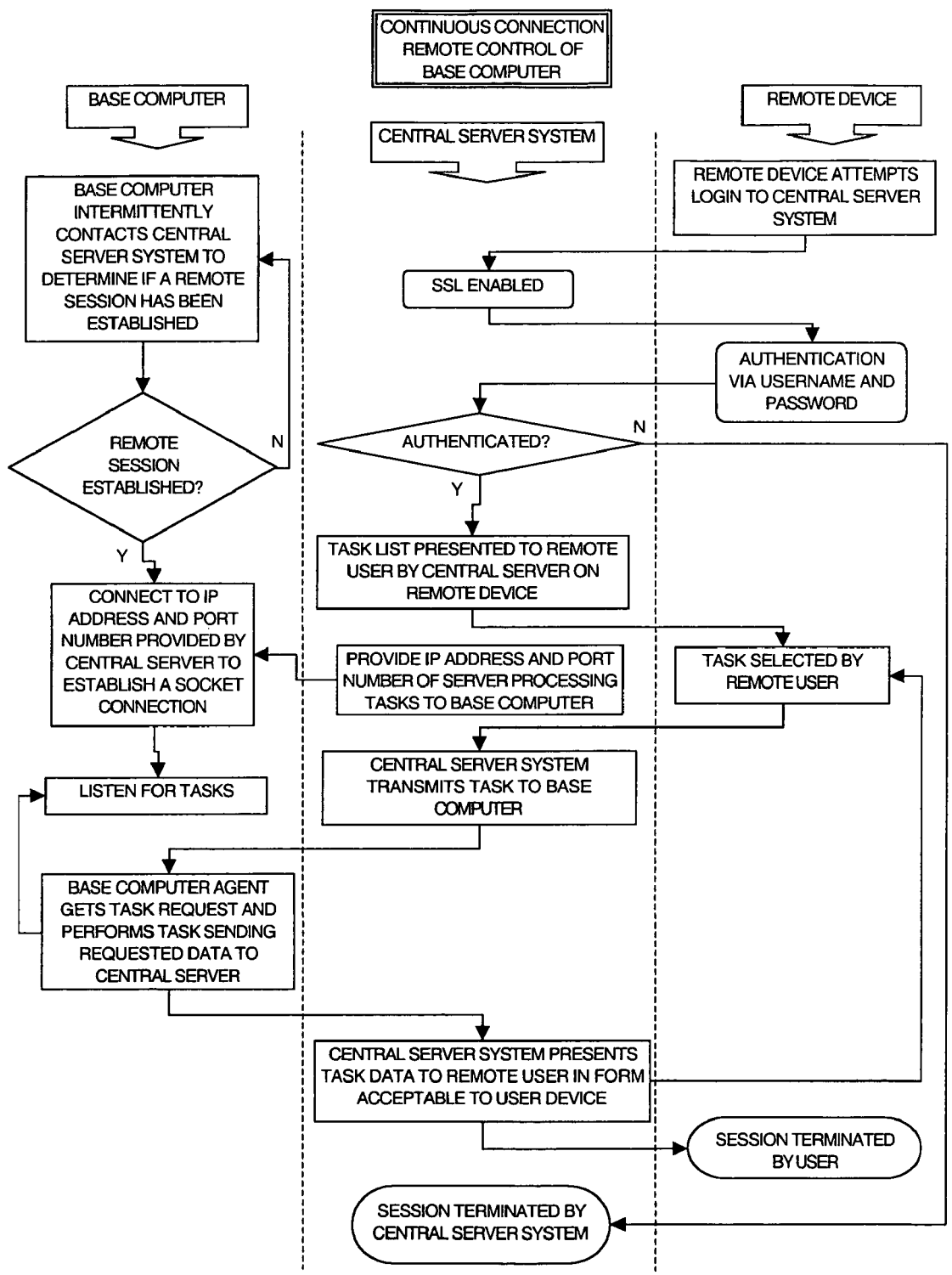
FIG. 4 is a flowchart of the present invention in a continuous connection environment.

More specifically, and referring now to FIGS. 2 and 4, a continuous connection remote access system and method are depicted. FIG. 2 is intended to be a graphical representation of the system, while FIG. 4 is intended to provide a flowchart of the system method. A "continuous connection" includes, but is not limited to such on demand or persistent connection means such as T1, T3, ADSL, ISDN or other similar types of connectivity as opposed to dial-up connections.

As shown in FIG. 2, a base computer 14 resides on a network with a plurality of other devices as is common in an office setting. That network resides behind firewall 15 which is intended to prevent unwanted access to the network from outside sources (hackers, etc.). A message may pass from within the firewall to outside sources such as internet 18 web servers as will be appreciated by those skilled in the art. Likewise, responses to such outgoing signals are allowed back through the firewall as they are deemed wanted since a device within the firewall requested them. The communication media is continuously available to users as is known and common in large group settings such as offices. That is, access does not require any additional level of effort by base computer 14, as would be the case for dial-up connections. Thus, FIG. 2 depicts one embodiment of the invention where the environment includes a continuous open connection between base computer 14 and central server system 12 via internet 18 preferably in an encrypted manner.

On the other hand, mobile devices 16 are also capable of connecting to central server system 12 as they would any other internet resource. Central server system 12 includes the necessary server subsystems for communicating appropriately with each such remote device. Co-pending application Ser. No. 09/618,954 entitled METHOD AND APPARATUS FOR A SECURE REMOTE ACCESS SYSTEM, filed Jul. 19, 2000, describes more fully this method, system, and apparatus of implementing the server subsystems within the central server system and is expressly incorporated herein by reference. For instance, one server within central server system 12 may communicate to WAP (wireless application protocol) enabled devices 16, cellular telephones for instance, while another may communicate to IP (internet protocol) enabled devices 16, laptop computers for instance. The communication between remote devices 16 and central server system 12 is preferably accomplished in a secure and authenticated manner, such as by secure sockets layer (SSL) and passwords.

Software installed on the base computer 14, an agent as described in U.S. patent Ser. No. 09/618,955, incorporated herein by reference, provides the capability of receiving tasks from central server system 12. It is also capable of performing those tasks on data within base computer 14. For instance, if the agent within base computer 14 receives a task from central server system 12 and central server system 12 transmits the task of getting a file directory from the base computer, the agent responds by providing the base computer 14 directory structure in a manner understandable by central computer system 12. Furthermore, in this continuous connection environment, the agent in base computer 14 "listens" (since a persistent socket connection has been established) for new tasks from central server 12.

Thus, and referring now especially to FIG. 4, the base computer 14 will intermittently contact central server system 12 to determine if a remote session has been established (i.e. a session between a remote device 16 and central server system 12). If a remote session has been established, central server system 12 replies to base computer 14 with an IP address and port number for the base computer 14 to connect with to receive tasks. Base computer 14 then establishes the specified socket connection and awaits ("listens" for) tasks. In this manner, complications associated with firewalls as described above, may be avoided. That is, the connection originates with the base computer 14 and is allowed to go out to central server system 12. Furthermore, the reply transmitted from central server system 12 to base computer 14 is likewise allowed as will be understood by those individuals familiar with firewalls.

However, before any communication between central server system 12 and the agent of base computer 14 may take place, a user must have registered with central server system 12. Registration includes the providing of typical user information such as name, address, telephone number, and so forth and will likewise include an associated password for authentication purposes. The authentication is necessary to establish whether remote users are who they purport to be.

Thus, once a user account is established and a record thereof created in the central server system 12 database, a user may then remotely access the base computer 14 with a remote device 16 as follows. From a remote device 16, the user attempts to contact central server system 12 to initiate a remote access session. Central server system 12 enables an SSL session (if remote device 16 is able to communicate via SSL) and requests a username and password from the remote user. The remote user provides a username and password that is verified against the central server system database record discussed above. If the central server system 14 cannot verify the remote username and password provided (one or more attempts may be allowed, but a limited number of attempts is preferred for security reasons), then the session is terminated by the central server system.

On the other hand, if the remote user is authenticated (username and password provided by remote user match central server system database record), then a list of tasks is presented to the remote used to choose amongst. The list may include such tasks as "check email", "get directory list", "upload files to base computer", "download files from base computer", "get address book", and other like tasks. This list may be presented as text or as icons or both depending on the remote device protocol limitations or capabilities. The user will then select a task from the list.

Upon receipt of the user task selection form remote device 16, the central server system 12 then transmits that task to the connected base computer 14. Then, upon receipt of the task request, base computer 14 performs the task in accordance with the agent-defined instruction set. For instance, if the task is to provide a directory listing, the agent will provide the necessary directory tree information to the central server system 12.

Thereafter, the central server system 12, upon receipt of the data from base computer 14, presents the information to the remote device in a manner viewable by the remote device (HTML for a remote computer using a browser for instance). The presented information, will also include other tasks or subtasks that may be selected by the remote user (subdirectories of the directory may be needed in a next step). The remote user will continue selecting tasks or subtasks until wishing to end the session at which time the end session task will be selected. The session is then terminated by the user and central server system 12. Of course, after a period of no selections or activity on the part of the remote user, the session may be terminated by the central server system as well as will be appreciated by those skilled in the art now informed by this disclosure.

Figure 3:
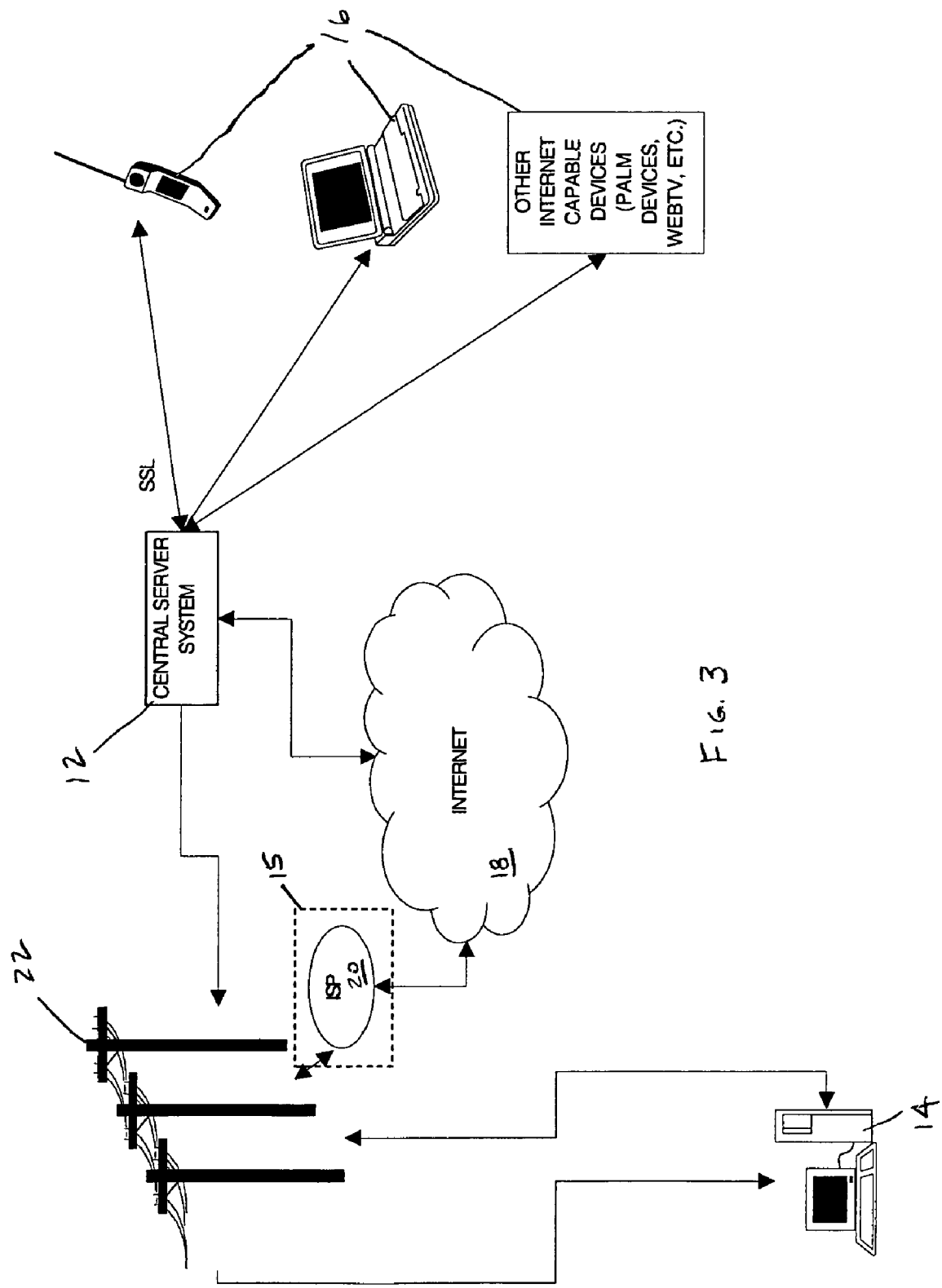
FIG. 3 is a schematic diagram of the present invention in a non-continuous connection environment.
Figure 5:
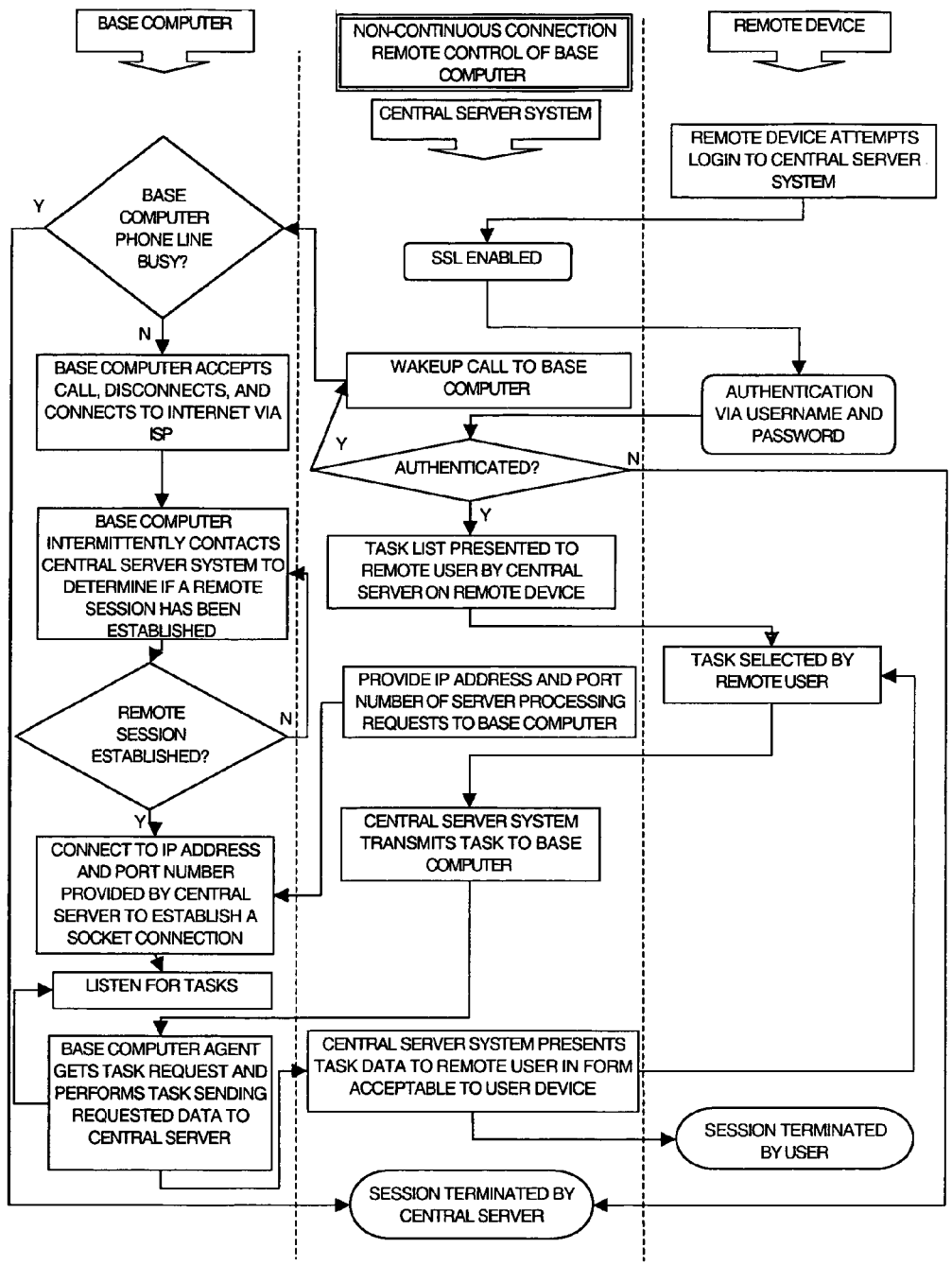
FIG. 5 is a flowchart of the present invention in a non-continuous connection environment.

In an alternate embodiment, namely a non-continuous connection environment for the base device, and referring now to FIGS. 3 and 5, the present invention is likewise depicted. In this environment, non-continuous connection means a connection between the base computer 14 and the central server system 12 in which the connection is not persistent, such as a dial-up or PSTN connection. That is, many home computers are capable of connecting to the internet only by way of a dial-up connection via a local ISP 20. Typically, that ISP resides behind a firewall. Therefore, it is desirable to enable such home users constrained by dial-up connections to access the home computer 14 when away from the home computer 14 with a remote device 16.

As will be understood by those familiar with connecting to an ISP from a home computer via a dial-up connection, the base or home computer 14 must first establish a connection via a PSTN ("POTS") 22 with the ISP by dialing into one or more predefined telephone numbers. If the ISP verifies the user appropriately, such as by a username and password, then the connection is allowed to continue until the user logs off or some other event terminates the session. Also important, but not typically an issue for a dial-up ISP user, is that a firewall typically precludes unwanted incoming traffic from other internet sources to the ISP. Thus, connected users can send messages from the ISP to other internet sources and receive responses, however, unsolicited incoming traffic is generally precluded by the ISPs firewall 15 to prevent unwanted attacks (or hacks) on the ISP servers and system devices.

A remote user having a remote device 16 may connect to the central server system 12 as described above for a continuous connection (i.e. SST, password, authentication, etc.), but in this non-continuous connection environment the base computer 14 may either not be on or at least not connected to the internet. Thus, making it impossible for the base computer to intermittently contact the central server system 12 as described above. However, the central server system 12 can record the telephone number of the base computer's modem upon registration by requiring the user to provide such information upon registering. Having this information then, when the central server system 12 is contacted by a remote device 16, central server system 12 will, via one or more available modems (i.e. a modem bank), dial the base computer modem line telephone number to attempt a connection therewith.

As will be appreciated by those familiar with modern modems, the base computer 14, if not already on, may turn itself on when the modem therewith is called upon by the central server system 12 and a connection established. Thus, once "awakened," the agent within the base computer 14 may initiate contact processes as follows. First, the connection is terminated with central server system 12, thus minimizing costs associated with the central server system 12 having to dial into the base computer 14. Then, the base computer 14 can establish an internet connection by dialing into ISP 20 via PSTN 22. Once connected to the internet in this manner, base computer 14 via the agent may begin intermittently contacting the central server system 12 to determine if a remote session has been established, not unlike the process described above for the continuous connection environment. On the other hand, if upon attempting to establish a connection with base computer 14, central server system 12 encounters a "busy" signal, then the session with the remote device is terminated.

More specifically, and referring now especially to FIG. 5, a user having a remote device will attempt to login to central server system 12 and central server system 12 will establish (if possible) a SSL connection. A username (or number) and password are then requested of the remote user by central server system 12. If authenticated, a task list is presented to the remote user by the central server system 12 on remote device 16. If authentication fails, the session is terminated. If authentication succeeds, central server system 12 initiates a call to base computer 14's modem.

If the base computer 14 modem is not busy, then the agent therein disconnects the line and establishes a connection with the user's ISP 20 (as described above). Once the connection with the ISP 20 is established, the agent will begin intermittently contacting central server system 12 to determine if a remote session has been established. If a remote session has indeed been established, the central server system 12 will send an IP address and port number of the server processing tasks for the session to the base computer 14. Then the base computer 14 establishes a connection at the specified IP address and port number and begins "listening" for tasks on the established socket connection. Once a task is selected on the remote device 16 by a remote user, the central server system 12 will transmit that task request to the base computer via the established socket connection. Then, as with the continuous connection environment, the base computer will perform the task by supplying the data necessary to fulfill the task to the central server system 12. This process will continue until the session is terminated by the central server system (via selection of a termination task request by a remote user or the expiration of a predefined time-out period).

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A remote access system, comprising in combination:
    a server system in operative communication with at least one remote device and at least one base computer responsive to establishment of a remote access session between the at least one remote device and the server system, and responsive to intermittent communication between the at least one base computer and the server system, wherein the at least one remote device includes open application standard remote access software to establish a remote access session with the server system, and wherein the at least one remote device includes non-proprietary remote access server software and non-proprietary remote control system software;
    a task transmitter within said server system for transmitting tasks submitted by said at least one remote device to said at least one base computer; and
    a task data receiver within said server system for receiving task data from said at least one base computers and returned to the remote device.

2. The remote access system of claim 1 further comprising security services enabled between said server system and said at least one remote device, and between said server system and at least one base computers.

3. The remote access system of claim 2 wherein said security services between said server system and at least one remote device include means for authenticating the user of the remote device.

4. The remote access system of claim 3 wherein said security services between said server system and at least one base computer includes encryption.

5. A method for remotely accessing a base computer from internet-enabled remote devices, the method comprising in combination:
    establishing a remote access session with one of the remote devices at an internet central server system, wherein the remote devices include open application standard remote access software to establish the remote access session, and include non-proprietary remote access server software and non-proprietary remote control system software;
    presenting a task list to the remote device from said internet central server system;
    receiving a task selection at said internet central server system from the remote device;
    establishing a persistent connection between said internet central server system and a base computer in response to intermittent contact from said base computer to said internet central server system, and in response to establishing a remote access session between the one of the remote devices and the internet central server system;
    transmitting said task from said internet central server system to the base computer via said connection between said internet central server system and said base computer;
    receiving at said internet central server system task data from the base computer responsive to said transmitted task; and
    presenting from said internet central server system a task response compiled from said task data to the remote device.

6. The method of claim 5 further comprising terminating said remote access session by said internet central server system.

7. The method of claim 6 further comprising communicating said task response via a protocol compatible with the remote device.

8. The method of claim 7 wherein said protocol is TCP/IP for remote devices configured as computers.

9. The method of claim 7 wherein said protocol is WAP for remote devices configured as wireless communication devices.

10. The method of claim 5 further comprising authenticating the user of the remote device while establishing the remote access session.

11. The method of claim 10 further comprising providing a secure communication means while establishing the remote access session and continuing said secure communication between said internet central server system and the remote device until said session is terminated.

12. The method of claim 11 further comprising encrypting the communications between said internet central server system and the base computer.

13. The method of claim 12 further comprising establishing a communication link between the base computer and the internet central server system when the base computer is not already connected to the internet.

14. The method of claim 13 further comprising dialing up a base computer modem by the internet central server system to wake up the base computer to establish said communication link.

15. The method of claim 14 further comprising disconnecting from the dial up connection by the base computer and then reestablishing the communication link via the internet between said internet central server system and said base computer.

16. A method for remotely accessing a base computer from internet-enabled remote devices, the method comprising in combination:
    establishing a remote access session with one of the remote devices at an internet central server system, wherein the remote devices include open application standard remote access software to establish the remote access session, and include non-proprietary remote access server software and non-proprietary remote control system software;
    presenting a task list to the remote device from said internet central server system;
    receiving a task selection at said internet central server system from the remote device;
    establishing a persistent connection between said internet central server system and a base computer in response to intermittent contact from said base computer to said internet central server system;

transmitting said task from said internet central server system to the base computer via said connection between said internet central server system and said base computer;

receiving at said internet central server system task data from the base computer responsive to said transmitted task;

presenting from said internet central server system a task response compiled from said task data to the remote device;

authenticating the user of the remote device while establishing the remote access session;

providing a secure communication means while establishing the remote access session and continuing said secure communication between said internet central server system and the remote device until said session is terminated;

encrypting the communications between said internet central server system and the base computer;

establishing a communication link between the base computer and the internet central server system when the base computer is not already connected to the internet; and dialing up a base computer modem by the internet central server system to wake up the base computer to establish said communication link.

17. The method of claim 16 further comprising disconnecting from the dial up connection by the base computer and then reestablishing the communication link via the internet between said internet central server system and said base computer.

\* \* \* \* \*